United States Patent [19]

Chicoye et al.

[11] Patent Number: 4,759,941

[45] Date of Patent: Jul. 26, 1988

[54] ANACTINIC HOPPING MATERIALS AND METHOD OF PREPARATION

[75] Inventors: Etzer Chicoye, Wauwatosa, Wis.; Walter H. Fly, Las Vegas, Nev.; Henry Goldstein, Brookfield, Wis.

[73] Assignee: Miller Brewing Company, Milwaukee, Wis.

[21] Appl. No.: 728,831

[22] Filed: Apr. 30, 1985

[51] Int. Cl.$^4$ .................... C12C 3/00; A23L 1/221
[52] U.S. Cl. .................... 426/600; 426/655; 426/431
[58] Field of Search ............ 426/600, 655, 431

[56] References Cited

U.S. PATENT DOCUMENTS

| | | | |
|---|---|---|---|
| 3,044,879 | 7/1962 | Koch et al. | 99/50.5 |
| 3,532,504 | 10/1970 | Flesch | 99/50.5 |
| 3,558,326 | 1/1971 | Westermann et al. | 99/50.5 |
| 3,751,266 | 8/1973 | Kuroiwa et al. | 99/50.5 |
| 3,798,332 | 1/1973 | Westermann et al. | 426/29 |
| 3,839,588 | 10/1974 | Sweett et al. | 426/349 |
| 3,965,188 | 6/1976 | Westermann et al. | 426/600 |
| 4,154,865 | 5/1979 | Grant | 426/600 |
| 4,212,895 | 7/1980 | Laws et al. | 426/600 |
| 4,324,810 | 4/1982 | Goldstein et al. | 426/600 |

*Primary Examiner*—Elizabeth Weimar
*Attorney, Agent, or Firm*—Quarles & Brady

[57] ABSTRACT

A hopping material useful as a kettle additive in preparing anactinic malt beverages is prepared by a method which includes first forming an aqueous suspension of crude hops, containing alpha acids and cellulosic material and alkali hydroxide and an alkali borohydride. The suspension, which has a pH above about 10.5, is heated to isomerize and reduce the alpha acids initially present in the hops. The pH is lowered to about 2 to convert the reduced iso-alpha acids to their free acid forms so that they are adsorbed on cellulosic hop material in the reaction mixture. The cellulosic material which now contains the free isomerized and reduced alpha acids is isolated and is useful as an anactinic kettle additive which can be stored for prolonged periods with no decomposition. If desired, the cellulosic material thus obtained can be further treated by adjusting the pH with an alkaline solution to obtain an aqueous solution containing only reduced iso-alpha acids, which is useful as an anactinic post-kettle additive, and a cellulosic material, which is useful as an anactinic kettle additive.

8 Claims, No Drawings

ANACTINIC HOPPING MATERIALS AND METHOD OF PREPARATION

FIELD OF THE INVENTION

The present invention generally relates to hopping materials for use in flavoring malt beverages. More particularly, it relates to novel anactinic hopping materials and a method of preparing such materials without using organic solvents.

BACKGROUND OF THE INVENTION

Hops, in the form of either the ground dried plant or an extract, are used in brewing to give the malt beverages, such as beer or ale, their characteristic bitter flavor and pleasant aroma. The hops or a hop extract may be added to boiling wort in the brewing kettle. An isomerized hop extract, if it is highly purified, may be added post kettle, i.e., after the wort has been boiled or after fermentation.

The primary hop constituents used in the brewing process are the alpha acids, the beta acids, the uncharacterized soft resins and the hop oils. The alpha acids are known as humulones and the beta acids are known as lupulones. The alpha acids are the precursors of the bitter substances in beer. The beta acids or lupulones have low solubility in kettle wort and beer and play a relatively minor role in the brewing process.

During brewing, chemical changes are made in the humulones resulting in the formation of compounds known as isohumulones, i.e., isohumulone, isocohumulone and isoadhumulone. These iso-alpha acids are formed in the kettle during the boiling stage of the normal brewing process and are the primary contributors to the characteristic bitter flavor of beer and ale.

Hop extracts have been used in brewing beer for a number of years. The reasons are several fold. When whole hops are added to the kettle, the yield of isohumulone is poor, e.g., 20-25% based on the humulone present in the hops. However, the conversion of humulones in a hop extract to isohumulones can be very high, e.g. 80%. Furthermore, the utilization of the pure isohumulones in a preisomerized extract which is added post kettle is known to be extremely high, e.g. 70-90%.

In order to use a hop extract post kettle, it must contain isohumulones of a high degree of purity and only insignificant amounts of the other components of a preisomerized extract such as lupulones, waxes and other hop insoluble residues which can cause substantial haze, i.e., turbidity or gushing, i.e., rapid carbon dioxide release.

Extracts containing isohumulones of only 80% purity, for example, cannot be added post kettle in amounts exceeding approximately 10-15 p.p.m. of isohumulone without the possibility of causing turbidity in the finished product. On the other hand, extracts containing isohumulone of high purity, 90%+, can be added post kettle at levels exceeding 20 p.p.m. without a significant increase in turbidity.

It is known that isohumulone derived from hops or an unreduced hop extract can cause light instability in malt beverages. The exposure of such a beer or ale to light can result in the beverage becoming "light struck" and having a skunky odor.

The present invention relates to hopping materials, including hop extracts, which may be used to prepare light stable or anactinic malt beverages and to methods of preparing such materials without using organic solvents.

The prior art practice for the production of anactinic hopping materials consists of extracting the essential bittering acids from the cellulosic material of the hop blossom by the use of either organic solvents (e.g., alcohols, chlorinated hydrocarbons, low boiling petroleum solvent) or carbon dioxide, separating the solvent phase from the solid phase, and chemically processing the solvent phase which contains the extracted hop acids to isomerize and reduce the humulones present. The prior art use of organic solvents is now frowned on because of the possibility of residues in the final products and environmental considerations involved in getting rid of organic solvents. These problems are eliminated by $CO_2$ extraction, but unfortunately it involves the use of expensive equipment. In addition, the prior art practices entail some unavoidable product loss in the extraction processes because some 10% or more of the humulone remains in the cellulosic material which is discarded.

SUMMARY OF THE INVENTION

It is the primary object of the present invention to disclose a novel and efficient process of preparing anactinic hopping materials without the use of organic solvents or expensive equipment.

The method of the present invention comprises extracting and simultaneously isomerizing, and reducing the desired bittering constituents in the crude hops with an aqueous solution of alkali hydroxides and alkali borohydrides. In this method the isomerization and reduction are done without separating the liquid phase. Thus, both the need to use organic solvents and the need for expensive high pressure vessels such as are required for carbon dioxide extraction are eliminated.

The aqueous alkali extraction of hops has been practiced in Europe for a number of years but it has not been used to prepare a hop extract to be isomerized and subsequently reduced because it is known that at high pH's the alpha acids are hydrolyzed or converted to humulinic acid and other undesirable compounds. Therefore, it is surprising that the simultaneous isomerization, and reduction of the humulones of the crude hops can be accomplished with solutions having high pH's (e.g. above about 10.5) without the formation of substantial amounts of humulinic acid or other undesirable compounds. Apparently, the presence of the alkali borohydride in the solutions prevents the alpha acids from being converted into undesirable compounds.

An important advantage of the method of the present invention is that when using either the kettle or split hopping technique, no expensive bittering material is lost. Furthermore, as is general knowledge to those skilled in the art, the kettle utilization of isohumulone is better than the utilization of humulone from dry hops. The modified cellulosic hop material may be added to the kettle in the same manner as hops is added in the traditional kettle hopping technique.

An anactinic hop extract suitable for use as either a kettle additive or a post-kettle additive can be prepared by treating the modified cellulosic hop material with an aqueous alkali solution to preferentially solubilize the reduced isohumulones and obtain an extract of high purity.

It is a further object to disclose novel and useful anactinic hopping materials.

DESCRIPTION OF THE PREFERRED EMBODIMENT

In the preferred practice of the method of the present invention, a suspension is formed by adding the hops, preferably ground or in the form of pellets, to an aqueous solution of alkali hydroxide and alkali borohydride having a pH of about 10.5 to about 12 at an elevated temperature above 50° C. and preferably between about 60° to about 85° C. The mixture is agitated vigorously for about three hours during which the alpha acids are converted to salts and subsequently isomerized and quickly reduced, the mixture is then cooled to room temperature and the pH lowered to convert the salts of the reduced isoalpha acids to the free acids which are deposited on the hop cellulosic material in the reaction vessel. Preferably the pH adjustment is to a pH of less than about 2, using sulfuric acid. The solid phase which comprises the treated cellulosic hop material and which contains the isomerized and reduced alpha acids, is separated from the aqueous phase and the aqueous phase is discarded. The cellulosic hop material is washed with water or dilute sulfuric acid to remove any inorganic salts or boron compounds. The washed cellulosic hop material may be either added directly to the wort kettle as an anactinic hopping material, or further processed to produce both a kettle additive and a post-kettle additive for split hopping or simply dried and suitably stored for future use.

The aqueous alkali hydroxide and alkali borohydride solution preferably has a pH of about 10.5 to about 12 and contains an amount of alkali borohydride in excess of that required to reduce the humulone and other reducibles in the hops. The amount of alkali borohydride may be from 1 to 5 and preferably about 3 moles of alkali borohydride per mole of humulone in the material to be treated. The alkali hydroxide is preferably sodium hydroxide or potassium hydroxide and the preferred alkali borohydride is sodium borohydride.

If a post-kettle hopping additive is desired, the treated cellulosic hop material is slurried with an equal weight of water, the pH is adjusted to preferentially solublize the reduced isohumulone (e.g. to a pH of about 6.5 to about 7.5) using alkali hydroxide, preferably potassium hydroxide, and heated to about 60° C. The slurry is agitated for about 30 minutes and the cellulosic hop material is separated from the alkaline aqueous solution. The aqueous solution is treated with further alkali hydroxide to stabilize the solution (e.g. to a pH of about 8.5 to about 9.0). This aqueous solution contains no unreduced isohumulone, no lupulone and only a small amount of humulinic acid and is suitable as an anactinic post-kettle additive. The separated cellulosic hop material which contains the remainder of the reduced isohumulone, the lupulone and other hop constituents can be used as a kettle additive in the split hopping technique. It also can be dried and stored for future use.

The practice of the invention is further illustrated by the following examples.

EXAMPLE 1

To a 4-necked, 3 liter round-bottom flask, equipped with a mechanical stirrer, a thermometer, a nitrogen inlet and a reflux condenser was added 1500 ml of distilled water. The water was agitated for 15 minutes with nitrogen flow through to remove any dissolved oxygen. To the above was added 12.70 grams of a stabilized water solution of sodium borohydride and sodium hydroxide having a pH of 12 and 50 g of hop pellets containing 73.1 mg/g of humulone and 46.4 mg/g of lupulone by U.V. analysis. The resulting mixture contained 3 moles sodium borohydride per mole of humulone. The mixture was heated at 60°–65° C. with nitrogen sweep and agitation for 3 hours.

At the end of this period, the mixture was cooled to room temperature and while still under nitrogen, the pH adjusted to 2 with 1:1 sulfuric acid.

The slurry was separated by centrifugation and the solids washed with 2% sulfuric acid and with water. The washes were done to reduce the sodium and boron content of the product.

A high pressure liquid chromatography (HPLC) examination of the isomerized and reduced cellulosic hop product showed the presence of a small amount of humulinic acid, no unisomerized humulone, the expected amount of lupulone and no unreduced isohumulone (detection level - less than 0.5%).

The analytical results are reported in Table 1.

TABLE 1

|  | Starting Material | Aqueous Phase | Cellulosic Product | % Accounted for |
|---|---|---|---|---|
| Solids | 47.5 g | 1.03 | 45.39 | 97.6% |
| Humulone | 73.13 mg/g | — | 72.19 mg/g as Red. Iso. | 98.7% |
| Lupulone | 46.42 mg/g | — | 44.25 mg/g | 95.3% |

The treated cellulosic hop solids of Example 1 were suitable for use as a kettle additive for the production of an anactinic malt beverage by the kettle hopping technique.

EXAMPLE 2

Preparation of Post-Kettle Additive

A sample of 30.4 g of dry cellulosic hop solids (containing 2.195 g reduced isohumulone) from Example 1 were slurried with 225 ml of water. The pH was adjusted to a value of between 6.5 and 7.5 with potassium hydroxide and the mixture heated to 60° C., under nitrogen and with agitation for 30 minutes. At the end of the reaction period, the slurry was cooled to room temperature and separated by centrifugation. The aqueous phase was analyzed and found to contain 0.928 g of extractable solids which contained 0.8369 g of reduced isohumulone by standard ultraviolet analyses. From this analysis it is apparent that 38.1% of the available reduced isohumulone is in a form which is 90% pure and that the aqueous phase containing that reduced isohumulone of high purity is suitable for use as a post-kettle additive.

The residual cellulosic hop material contained the remaining 61.9% of the reduced isohumulone. It is useful as a kettle additive for the production of an anactinic malt beverage by the split hopping technique.

EXAMPLE 3

Preparation of Kettle and Post-Kettle Additives

Bullion hop pellets were employed which contained 21.65% hexane extractable solids. The pellets contained 7.3% humulone and 4.2% lupulone by U.V. analysis.

A. Preparation of Kettle Additive.

Fifty (50) grams of the pellets contained 3.67 g or 10.138 millimoles of humulone. The extracting, isomerizing, and reducing solution was a stable water solution (SWS) which had a pH of about 12 and contained sodium hydroxide and 0.1172 g or 3.097 millimoles sodium borohydride per gram of solution.

A mixture was made containing 50 grams of the hop pellets in 1800 ml of water with 13.1 g SWS (4 moles borohydride/mole of humulone).

The 1800 ml of water was first purged with nitrogen for 10 minutes to remove any oxygen. Then 13.1 g of SWS and 50 g of hop pellets were added. The mixture was heated to 85° C. for 3 hours, under reflux with good agitation and nitrogen purging. At the end of 3 hours the mixture was cooled to room temperature, still under nitrogen, and acidified to a pH of less than 2 using 1:1 sulfuric acid. The resulting slurry was separated by centrifugation and the cellulosic material washed twice with water.

There was a total of 21.15 g of extractable solids in the aqueous solutions. There also was recovered 29.8 g of isomerized and reduced cellulosic material indicating a total of 50.9 g of solids accounted for. This is essentially a 100% material balance based upon solids for the extraction, isomerization, and reduction process.

The analysis of the cellulosic solids by exhaustive hexane extraction indicated 257 mg/g extractable solids. The cellulosic material also contained:
Reduced Isohumulone: 111.86 mg/g
Lupulone: 4.96 mg/g.

The 29.8 g of the isomerized and reduced cellulosic hop solids contained 3.33 g of reduced isohumulone by U.V. analysis. This indicates a 91.2% recovery based upon starting humulone.

An HPLC examination of the hexane extractable solids from the isomerized and reduced cellulosic hop solids showed no detectable unreduced isohumulone.

The isomerized and reduced cellulosic hop solids were slurried with a minimum amount of water and freeze dried. The dried material which was suitable for use as an anactinic kettle additive was purged with nitrogen and stored in a freezer until needed.

B. Preparation of the Post-Kettle Additive 27.2 g of the above freeze-dried isomerized and reduced cellulosic hop solids were mixed with 500 ml of water. The pH of the mixture was adjusted to 6 to 7 with 6N potassium hydroxide and the mixture heated to 60° C. and agitated for 30 minutes under nitrogen. The mixture was cooled to room temperature and separated by centrifugation. The aqueous phase was brought to pH 8.5 to 9.0 using concentrated potassium hydroxide and analyzed for reduced isohumulone by UV. The solid cellulosic material was slurried with water and freeze dried. It was analyzed for reduced isohumulone by extraction and UV. Boron levels were acceptable in both materials. The aqueous phase (420 ml containing 3.9 mg/g of reduced isohumulone) was useful as a post-kettle material. The 19.3 g of freeze-dried cellulosic hop solids contained 46.7 mg/g of reduced isohumulone; the solids were useful as a kettle additive.

The resulting anactinic kettle and post-kettle additives were used to prepare a beer using the identical wort used to prepare a control beer. The only difference between the experimental beer and the control beer was that the hopping materials used in the experimental beer were those of the present invention; the control beer was made with hop pellets as the kettle additive and a post kettle additive made by the Westermann patent method.

The results of the chemical analysis of the two beers appears in Table 2.

TABLE 2

CHEMICAL ANALYSIS

| Component | Control | Experimental |
|---|---|---|
| Alcohol, % w/w | 3.65 | 3.60 |
| Real Extract, % w/w | 4.06 | 4.06 |
| Original Gravity, Calc. | 11.16 | 11.08 |
| Apparent Extract, % w/w | 2.36 | 2.38 |
| Protein, % N w/w × 6.25 | 0.34 | 0.32 |
| pH | 4.09 | 4.13 |
| Color, °SRM | 3.3 | 3.9 |
| BU | 14.8 | 15.4 |
| Polyphenols, mg/L | 102 | 74 |
| High Molecular Weight N, % w/w | 0.0122 | 0.0113 |

The results of the analysis for the head space volatiles most likely to have an aroma impact are recorded in Table 3. The analytical procedure was similar to that described in U.S. Pat. No. 4,068,005.

TABLE 3

HEADSPACE ANALYSIS OF BEER
ppm (mg/L)

| Volatiles | Control | Experimental |
|---|---|---|
| Acetaldehyde | 1.88 | 2.03 |
| n-Propanol | 11.4 | 12.8 |
| Ethyl Acetate | 36.7 | 39.4 |
| Isobutanol | 18.2 | 17.8 |
| Isopropyl Acetate | — | — |
| Ethyl Propanoate | 0.10 | 0.11 |
| Active Amyl Alcohol | 20.0 | 20.1 |
| Isoamyl Alcohol | 49.6 | 48.9 |
| Isobutyl Acetate | 0.13 | 0.12 |
| Ethyl Butanoate | 0.09 | 0.11 |
| n-Butyl Acetate | — | — |
| Isoamyl Acetate | 3.53 | 3.75 |
| Total | 141.6 | 145.1 |

The results of a test panel's evaluation of the various organoleptic characteristics of the beers are reported in Table 4. The procedure is described in detail in McCredy, J. M. et al, Food Technology, 28, 36–41 (1974).

TABLE 4

Quantitative Descriptive Analysis (QDA) Results

| Characteristic | Means Control | Experimental | F-Value | Level of Significance |
|---|---|---|---|---|
| Aroma Strength | 12.9 | 12.9 | 0.00 | NSD |
| Fruity/Estery | 9.8 | 9.4 | 1.58 | NSD |
| Sulphidic/tic | 4.2 | 5.0 | 4.77 | 95.0% |
| Diacetyl | 3.3 | 3.3 | 0.00 | NSD |
| Bitterness | 10.8 | 10.4 | 1.28 | NSD |
| Aftertaste | 10.6 | 10.3 | 0.70 | NSD |

CONCLUSIONS

The test results indicated that there was essentially no difference between the experimental beer made with the hopping materials of the present invention and the control beer. The experimental beer had acceptable taste, light stability and foam characteristics. It had a slightly more sulphidic/tic character than the control beer, however, the sulphidic/tic levels were within acceptable limits. We have therefore demonstrated that it is possible, operating at atmospheric pressures, to prepare both an acceptable anactinic kettle and post-kettle bittering material directly from crude hops using only an aqueous solution of alkali hydroxide and alkali borohydride to simultaneously extract, reduce and isomerize the humulones in the hops and an aqueous alkali solution to prepare the post-kettle additive.

While the experiment used hop pellets, the same process could be used with hammer-milled hops or any other form of hops.

The exact mechanism of operation of the method of the present invention is not known. However, it appears that the treatment of the hops with the highly alkaline borohydride solution results in the alpha acids being extracted into the liquid phase where they are isomerized and reduced immediately thus preventing the formation of humulinic acid.

It was proven that extraction takes place by repeating the procedure in Example 1 and prior to the acidification step removing an aliquot from the reaction vessel. Filtration and analysis by HPLC showed that the aqueous alkaline solution contained rho-isohumulones (reduced isoalpha acids), a small amount of humulinic acid, and no observable unreduced isohumulones. The presence of the rho-isohumulones in the aqueous alkaline solution validates the use of the term "extraction" in the present application. The process of the present invention extracts the alpha acids from hops or hop pellets into the aqueous alkaline borohydride solution; the alpha acids are then isomerized and reduced to rho-iso-alpha acids, which remain in solution until acidification causes them to fall out of solution and adsorb to the hop solids present in the reaction vessel.

The cellulosic material having reduced isoalpha acids adsorbed thereon which is obtained by the treatment of whole hops or hop pellets with alkaline borohydride solution possesses greater storage stability than untreated hops thus allowing for the prolonged storage of hop bittering potential. The cellulosic material can be removed from storage and used as is as a kettle additive or treated further as described herein to yield both a post kettle additive and a kettle additive. If desired, the cellulosic material can be freeze-dried to provide even greater storage stability.

It will be apparent to those skilled in the art that the method of the present invention, in addition to being novel and useful, is also simple and economical. For example, only conventional separation techniques and equipment are used, no organic solvents are used and none of the potentially useful flavoring constituents of the original hop starting material are wasted.

It also will be apparent to those skilled in the art that a number of modifications and changes may be made without departing from the spirit and scope of the invention. Therefore it is to be understood that the invention is not to be limited by the description and examples but only by the claims which follow:

We claim:

1. A method of preparing a hopping material suitable for use as an anactinic kettle additive for preparing malt beverages which comprises forming an aqueous mixture of hops, containing alpha acids and cellulosic hop material and an amount of alkali borohydride sufficient to reduce said alpha acids, said mixture having a pH above about 10.5; heating the mixture at a temperature of about 50° C. to about 85° C. to convert the alpha acids into their reduced iso-alpha acid salts; lowering the pH to an acidic pH effective to convert the reduced iso-alpha acid salts into the corresponding free acids and to cause them to be adsorbed on the cellulosic hop material; and, then isolating the cellulosic hop material which contains the reduced isoalpha acids and which is useful as an anactinic kettle additive.

2. The method of claim 1 in which the isolated cellulosic hop material is washed with water to remove inorganic salts and boron compounds.

3. The method of claim 1 in which the cellulosic hop material, which has adsorbed thereon the reduced iso-alpha acids, is extracted with an aqueous alkaline solution at a pH of about 6.5 to about 7.5 to solubilize the reduced iso-alpha acids and extract them in highly purified form from the cellulosic hop material to obtain both an aqueous phase, which can be separated and is useful as an anactinic post-kettle additive because it contains no unreduced iso-alpha acids, and a solid fraction, which consists of the cellulosic hop material, and which is useful as an anactinic kettle additive since it contains some residual reduced iso-alpha acids.

4. A method of isolating reduced iso-alpha acids from an aqueous mixture, which contains reduced iso-alpha acid salts and solid cellulosic hop material, which method comprises adjusting the pH of the mixture to an acidic pH at which substantially all the reduced iso-alpha acid salts are converted to free acids and the free acids are adsorbed on the solid cellulosic hop material, and then isolating the solid cellulosic hop material with the free acids adsorbed thereon from the remainder of the mixture.

5. The method of claim 4 in which the isolated solid cellulosic hop material is washed with an aqueous solvent to remove any water soluble compounds.

6. An anatinic kettle additive consisting essentially of reduced iso-alpha acids, lupulones and cellulosic hop material, said additive being free of residual organic solvents and metallic ions and possessing greater storage stability than untreated hops or hop pellets.

7. A method of preparing a hopping material useful as an anactinic post-kettle additive which comprises treating a solid cellulosic hop material having reduced iso-alpha acids adsorbed thereon with an aqueous alkaline preparation at a pH of about 6.5 to about 7.5 to extract the reduced iso-alpha acids from the cellulosic hop material and then removing the cellulosic hop material to obtain an aqueous solution of the reduced iso-alpha acids which is useful as an anactinic post-kettle additive.

8. An anactinic post-kettle additive consisting essentially of reduced iso-alpha acids, said additive being free of residual organic solvents.

* * * * *